United States Patent [19]
Howard

[11] Patent Number: 5,705,976
[45] Date of Patent: Jan. 6, 1998

[54] ANTITHEFT ALARM SYSTEM FOR A CAR AND A CAR STEREO HAVING A REMOVABLE PANEL

[75] Inventor: Damian Howard, Saitama-ken, Japan

[73] Assignee: Pioneer Electronic Corporation, Tokyo, Japan

[21] Appl. No.: 659,533

[22] Filed: Jun. 6, 1996

[30] Foreign Application Priority Data

Jun. 9, 1995 [JP] Japan .................. 7-168019

[51] Int. Cl.⁶ .................................. B60R 25/10
[52] U.S. Cl. .................. 340/426; 340/430; 340/568; 340/687; 307/10.2; 455/345
[58] Field of Search ................ 340/425.5, 426; 307/9.1, 10.1, 10.2; 340/430, 457, 527, 528, 568, 687; 455/345

[56] References Cited

U.S. PATENT DOCUMENTS

| | | | |
|---|---|---|---|
| 4,481,512 | 11/1984 | Tscheulin et al. | 340/825.25 |
| 4,758,817 | 7/1988 | Akiyama | 340/568 |
| 4,838,377 | 6/1989 | Kozaki et al. | 340/426 |
| 5,506,563 | 4/1996 | Jonic | 340/426 |
| 5,554,966 | 9/1996 | Iijima et al. | 340/426 |

*Primary Examiner*—Jeffery Hofsass
*Assistant Examiner*—Daniel J. Wu
*Attorney, Agent, or Firm*—Nikaido, Marmelstein, Murray & Oram LLP

[57] ABSTRACT

A car stereo has a removable panel attached to a body of the car stereo, the panel having a plurality of operation buttons for operating the car stereo. An alarm device is provided in a motor vehicle. A first detector is provided for detecting removing of the panel from the body, and a second detector is provided for detecting turning on of an ignition switch of the motor vehicle. A third detector is provided for detecting opening of a door of the motor vehicle. At lapse of a predetermined first period of time after the detection of the door open, the alarm device is operated unless detection of attaching of the panel and turning on of the ignition switch.

4 Claims, 3 Drawing Sheets

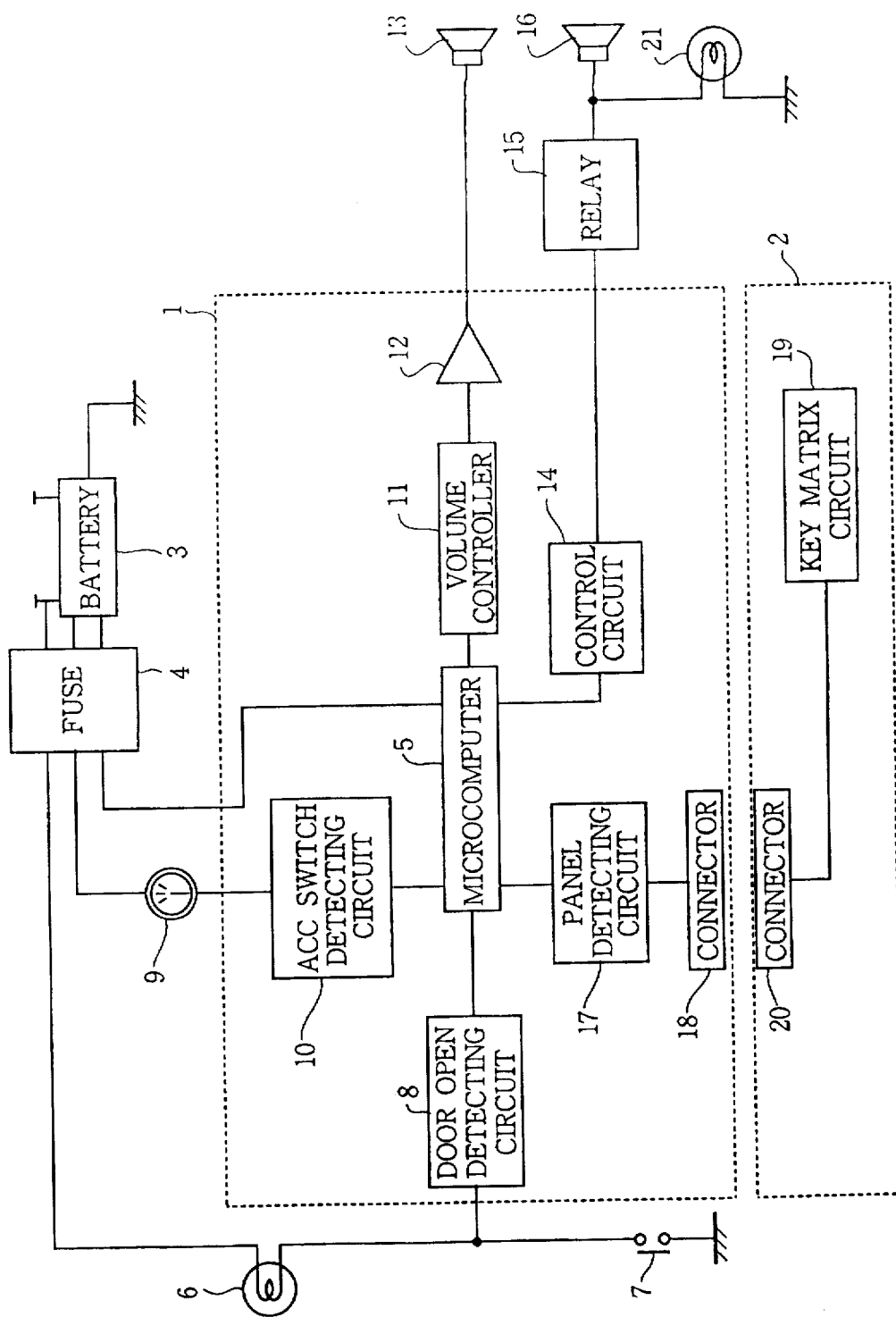

ANTITHEFT ALARM SYSTEM FOR A CAR AND A CAR STEREO HAVING A REMOVABLE PANEL

BACKGROUND OF THE INVENTION

The present invention relates to an antitheft alarm system for a car and an electronic device mounted in the car.

In order to prevent a theft of a car stereo and other electronic devices provided in the car, there has been made many proposals. In accordance with one of the proposals, a removable panel having a plurality of push button, keys and a display for controlling the stereo is attached to the body of the stereo. When the removable panel is attached to the body, a circuit provided therein is electrically connected to a circuit in the body, thereby enabling the car stereo to operate. The body is totally useless unless the panel is attached. Hence, if the driver takes the panel with him when leaving the car, the theft of the car stereo can be prevented.

In accordance with another proposed system, a car stereo is provided with means for registering an identification code. The user, when leaving the car, stores an arbitrary code in a memory provided in the car stereo by operating a ten-key keyboard which is used for designating songs to be played on the car stereo. if the car stereo is stolen from the car, a control unit provided in the car stereo determines that the car stereo is disconnected from a power supply. When the car stereo is again applied with power, the car stereo cannot be operated unless the code is input.

Some cars are provided with antitheft systems for preventing the theft of the car. The system is operatively connected to a door of the car. When the door is opened by a means other than a key of the owner, the car horn emits an alarming sound.

In order to prevent the theft of both the car stereo and the car itself, a system for each must be provided. Thus the antitheft systems become complicated and also the cost is increased. In addition, the systems takes up a space in the interior of the car. Moreover, the driver must carry out complicated operations to set and release the alarm which takes time. There is a further possibility of the driver forgetting the procedure for operating one of these systems.

SUMMARY OF THE INVENTION

An object of the present invention is to provide a antitheft alarm system of a car and an electronic device mounted in the car wherein the alarm can be easily set and released.

According to the present invention, there is provided a car stereo for a motor vehicle, the car stereo having a removable panel attached to a body of the car stereo, the panel having a plurality of operation buttons for operating the car stereo.

The car stereo comprises an alarm device provided in the motor vehicle, first detector means for detecting removing of the panel from the body and for producing a removing signal and an attaching signal dependent on the removing and attaching of the panel, second detector means for detecting operation of an ignition switch of the motor vehicle and for producing a switch ON signal and a switch OFF signal, third detector means for detecting opening of a door of the motor vehicle and for producing a door open signal, first determining means for determining lapse of a predetermined first period of time after the door open signal and for producing an alarm signal unless at least either of the attaching signal or the switch ON signal is generated, and alarm operating means responsive to the alarm signal for operating the alarm device.

The car stereo further comprises second determining means for determining lapse of a predetermined second period of time after removing signal and the switch OFF signal and for producing a lapse signal, the third detector means is provided for producing the door open signal after the lapse signal.

These and other objects and features of the present invention will become more apparent from the following detailed description with reference to the accompanying drawings.

BRIEF DESCRIPTION OF DRAWINGS

FIG. 2 is a block diagram of an antitheft alarm system of the present invention.

DETAILED DESCRIPTION OF THE PREFERRED EMBODIMENT

Figure 1A:
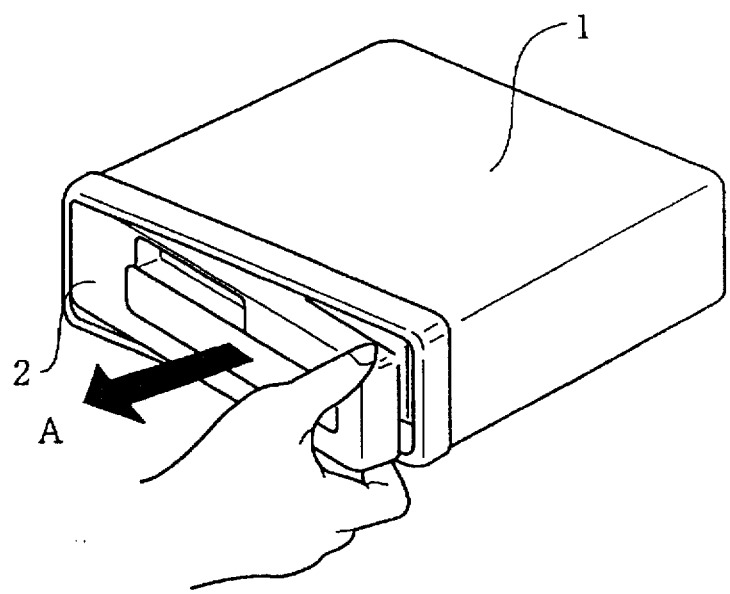
FIGS. 1a and 1b are perspective views of a car stereo to which the present invention is applied, each showing a panel thereof being removed and attached, respectively.
Figure 1B:
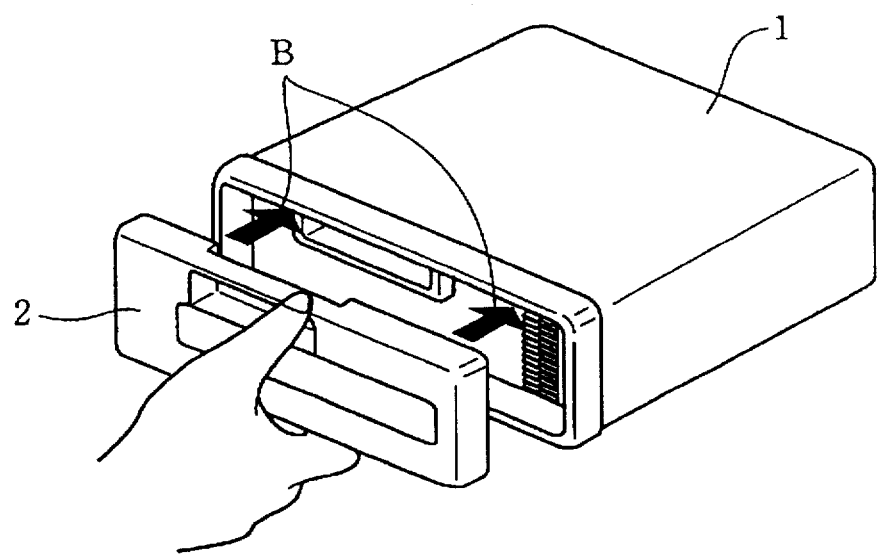

Referring to FIGS. 1a and 1b, a car stereo to which the present invention is applied has a body 1 and a removable panel 2 attached to the body 1. Although not shown in the figure, on the panel are provided a display and plurality of number keys such as from 1 to 20, various cursor control keys marked with arrows in vertical and horizontal directions. The keys are operated to activate a key matrix circuit 19 (FIG. 2) when playing the car stereo. If an electric circuit provided in the panel 2 must be connected to an electric circuit in the body 1, the panel and the body are each provided with respective connectors 20 and 18 (FIG. 2) for connecting the circuits.

As shown in FIG. 1a, the panel 2 is manually pulled in a direction shown by an arrow A to be removed from the body 1, and pushed against the body in a direction shown by an arrow B as shown in FIG. 1b to be attached thereto.

Referring to FIG. 2, in the removable panel 2, an antitheft alarm system according to the present invention comprises the key matrix circuit 19 operated by various keys, and the connector 20 connected to the matrix circuit 19. When the panel 2 is attached to the body 1, the connector 20 is connected to the connector 18 of the body 1 so as to render the car stereo operative.

The antitheft alarm system provided in the body 1 comprises a microcomputer 5 connected to a battery 3 of the car through a fuse 4. The power from the battery 3 and the fuse 4 are further applied to an ignition switch 9, and to room lights 6 which are operatively connected to a door switch 7 so as to be lighted when the door is opened. The microcomputer 5 is connected to various sensors for detecting the operational conditions of the car. Namely, there is provided a door open detecting circuit 8 connected to the room lights 6 and the door switch 7 to detect if the door is opened. An accessory switch detecting circuit 10 detects that the ignition switch 9 is in the accessory position. A panel detecting circuit 17 is further provided to detect that the removable panel 2 is electrically connected to the body 1. The output signals of these circuits 8, 10 and 17 are fed to the microcomputer 5.

The microcomputer 5 is connected to a speaker 13 of the car stereo through an electronic volume controller 11 and an amplifier 12. The microcomputer 5 is further connected to a horn 16 and hazard flashers 21, or to headlamps (not shown) through a control circuit 14 and a relay 15.

Figure 3:
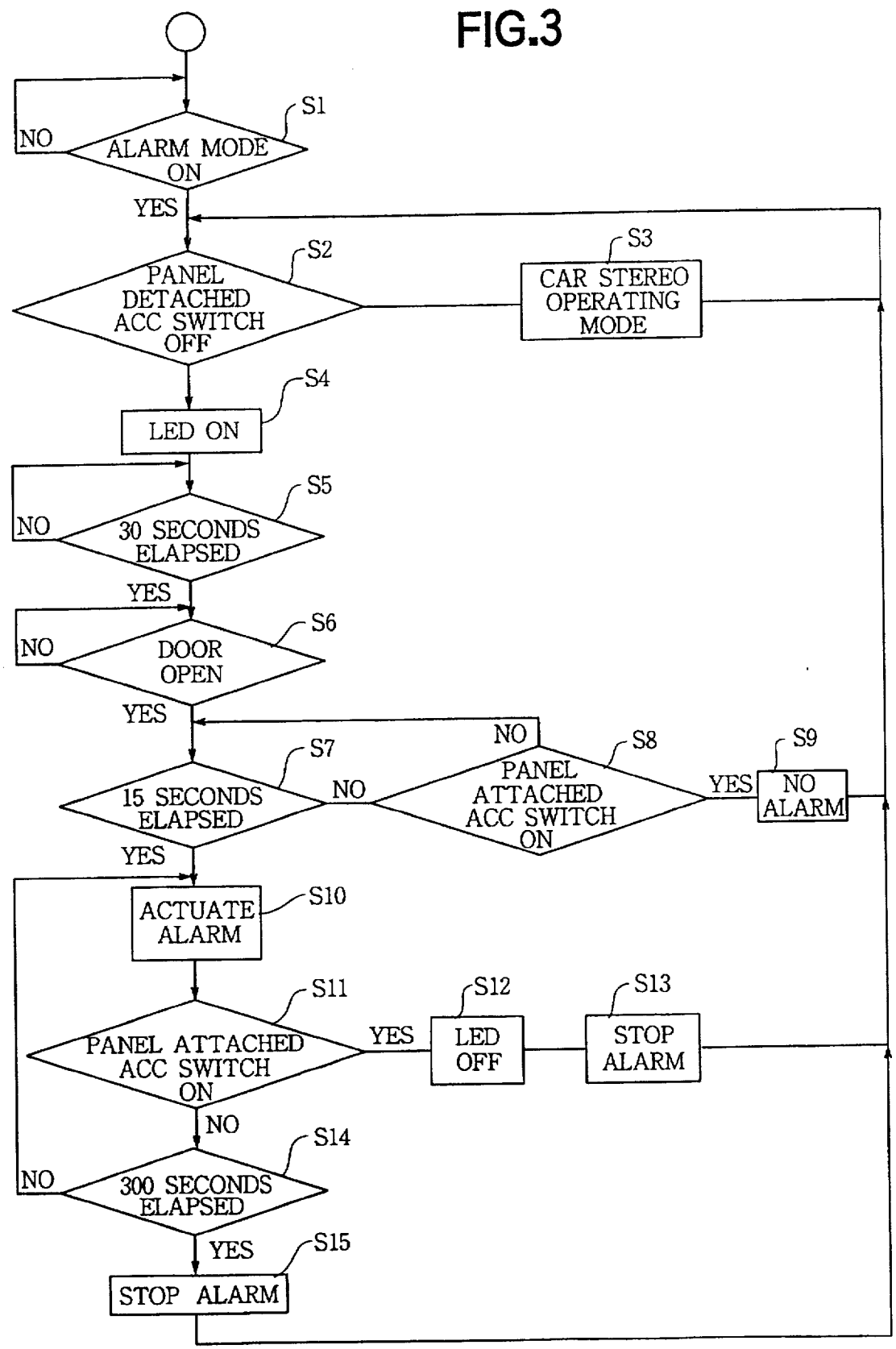
FIG. 3 is a flowchart describing the operation of the antitheft alarm system.

The operation of the present invention is described hereinafter with reference to the flowchart shown in FIG. 3.

When leaving the car, the driver sets an alarm mode by operating the cursor keys on the panel 2, the operation of which will be later described in detail. Hence, as shown in FIG. 3, the program goes from a step S1 to a step S2. The driver then removes the panel 2 from the car stereo body 1 to take the panel with him, and turns the ignition key so that the ignition switch 9 is turned off. The panel detecting circuit 17 and the accessory switch detecting circuit 10 accordingly applies signals to the microcomputer 5, so that the microcomputer detects the operations of the circuits 17 and 10. The program thereafter proceeds to a step S4.

When the microcomputer 5 (FIG. 2) determines at the step S2 that the panel 2 is attached to the body 1 or that the ignition switch is at the accessory position, the program goes to a step S3 wherein the car stereo is set in a car stereo operating mode. Hence, the program is in a loop comprising the steps S2 and S3, so that the car stereo can be normally operated.

On the front surface of the car stereo body 1 is provided an LED (not shown) which is turned off when the alarm mode is not set or when the panel 2 is attached to the body. When the panel detecting circuit 17 detects that the panel 2 is detached at a step S2, the LED starts to flash at the step S4.

At a step S5, it is determined whether a predetermined delay period such as thirty seconds has elapsed since the panel 2 was detached or the ignition switch was turned off at the step S2. The predetermined period set at the step S5 is the period of time during which the driver is expected to open the door and get out of the car. When the delay period is over, the driver is out of the car and the door is closed. Thus the alarm operation is prepared. The alarm preparation can be released during the predetermined delay period. The delay period is stored in a memory provided in the body 1.

The LED mounted on the body 1, which started to flash at the step S4, keeps on flashing even though the door is opened and closed by the driver during the delay period. When the panel detecting circuit 17 detects that the panel 2 is attached to the body 1, the LED is turned off and with the turning of the ignition switch to the accessory position, the car stereo operating mode is resumed.

After thirty seconds, when the door open detecting circuit 8 detects that the door of the car is opened either by the driver or by an intruder, the LED is turned off. In the case that the driver opened the door at a step S6, he will attach the panel 2 to the body 1 and turn the ignition key to the accessory position during a predetermined delay period, for example, fifteen seconds. At a step S7, if fifteen seconds do not elapse, the program goes to a step S8 where it is determined whether the panel is attached and the accessory switch is turned on. If yes, the program goes to the step S2 through a step S9.

In the case that the intruder opened the door at the step S6, the panel 2 cannot be attached to the car stereo body 1, nor can the ignition switch 9 be operated. Hence, after the lapse of fifteen seconds, the program goes to a step S10 where the alarm is sounded through the speaker 13 or the horn 16, or indicated by lighting the hazard flashers 21 or the headlamps (not shown).

In the present embodiment, the program is set to proceed to the step S9 when the ignition key is turned to the accessory position although the panel 2 may not be attached to the body 1. Such an operation allows the legitimate driver or a person entrusted with the key by the driver to open the door without actuating the alarm.

The driver may forget to attach the panel 2 or fail to do so within fifteen seconds, in which case the program goes to the step S10 so that the alarm is actuated. If it is determined at a step S9 that the panel 2 is attached, or the ignition key is turned to the accessory position, the program goes to a step S12 where the LED is turned off and further to a step S13 where the alarm is stopped. The program thereafter proceeds to the loop of steps S2 and S3 so that the car stereo can be played.

The alarm is actuated for only a predetermined length of time long enough to warn the existence of an intruder, for example, about 300 seconds. The length of time is set in the memory provided in the car stereo body 1. After it is determined at a step S14 that the alarm is actuated for 300 seconds, at a step S15, the alarm is stopped. Since the object of the alarm is already accomplished, the alarm is stopped to prevent the complete discharge of the battery.

The present invention may be modified that the LED on the body 1 is turned off when the door is opened at the step S6 and turned off if the door is closed again. The modification is adapted to operate so that if an intruder happened to open the door during the absence of the driver, the driver, upon return, sees the LED turned off and assumes the intrusion has occurred. Hence, although the intruder may cut off all of the electric connections of the alarm system so as to render the system inoperative, and hide himself in the car, the driver is still warned of the danger. Thus the driver can protect himself from any unexpected harm.

In order that the alarm mode is appropriately selected in accordance with the behavior of the driver and to obtain the improved antitheft effect, the car stereo according to the present invention has an alarm set mode. When the alarm set mode is selected, the delay period and other operating conditions can be set as appropriate.

The power must be supplied to the car stereo body 1 when selecting the alarm set mode. The car stereo is turned on when one of the following operations is carried out. Namely, a sound source such as a tape cassette and a CD is set in the car stereo, the ignition switch 9 is turned to the accessory position, or the removable panel 2 is attached to the body 1 so that the connectors 18 and 20 are connected to each other.

When the power is hence supplied, the function keys on the panel 2 such as the number keys and cursor control keys for actuating the key matrix circuit 19 are operated. For example, No. 1 key and No. 3 key are simultaneously depressed as the ignition key is turned to operate the ignition switch 9. Alternatively, No. 1 key and No. 3 key are simultaneously depressed as the panel 2 is attached to the body 1 to electrically connect the connectors 18 and 20 with each other. Thus the operational mode of the car stereo is changed from the stereo play mode to the alarm set mode whereby the liquid crystal display on the panel sequentially shows menus listing various operational conditions.

In the first menu after the alarm set mode is selected, options ON and OFF are shown for selecting whether to turn on or off the antitheft alarm mode. The alarm mode is initially set off so that, in order to turn on, either a right or left cursor key is operated to select the option ON. Thereafter, the program shown in FIG. 3 is executed. Hence the car stereo can be played in the normal manner or the antitheft alarm is set when the driver leaves the car.

In order to set the operational conditions of the alarm mode, the driver operates up and down cursor key to advance to the next menu after setting the alarm mode. The display then shows options for delay period counted at the step S7 of the flowchart shown in FIG. 3. By operating the right and left cursor keys, the driver may select one of the periods from the options of zero second (no delay), five seconds, fifteen seconds, thirty seconds, forty-five seconds and sixty seconds.

After selecting the desired period, the up and down cursor keys are again operated to indicate on the display the next menu for setting on or off of the speaker 13 (FIG. 2). When the option ON is selected by operating the right and left cursor keys, the alarm sound is emitted from the speaker 13 at the step S10 of the flowchart. When the option OFF is selected, the alarm is not emitted from the speaker 13.

When the option ON is selected, the up or down cursor key is operated to show the next menu, which is for carrying out an alarm sound test. The cursor is initially at a position marked TEST-OFF. When the right or left cursor key is operated, the alarm is sounded from the speaker 13, and at the same time, a numeral indicating the volume level thereof is shown on the display. The driver can select one of the levels from zero to thirty by operating the up and down cursor keys. The volume is initially set at a level 10. When the right or left cursor key is operated, the cursor returns to the position TEST-OFF, whereby the alarm is stopped.

Thereafter, the up or down cursor key is operated to show the next menu which is for selecting a door-close active condition. The menu is also shown when the turning off of the speaker 13 is selected at the previous setting operation.

It is necessary to set the door-close active condition since the condition of the door open detecting circuit 8 for detecting the operational state of the room lights 6 (FIG. 2) differ from car to car. More particularly, in some cars, the door open detecting circuit 8, based on the operation of the door switch 7, produces a low level signal when the door is opened, and in others, produces a high level signal. In order that the step S6 of the flowchart is accurately executed in accordance with the operation of the door switch 7, the door-close active condition is set. The display shows indications DOOR-L and DOOR-H, respectively representing the level of the output signal of the door open detecting circuit 8 when the door is closed. One of the indications are selected by operating the right and left cursor keys. The indication DOOR-L is selected in the initial state.

At the next stage which is reached by operating the up or down cursor key, it is checked whether the door-close active condition is correctly set so that the microcomputer 5 accurately determines the opening or the closing of the door in accordance with the set condition. Namely, if the cursor selects an indication DR-OPEN on the display, it means that when the door is in the same state as during the present checking operation, the microcomputer 5 will determine at the step S6 of the flowchart shown in FIG. 3 that the door is open. If the door is actually open, the condition is correctly set. If the door is actually closed despite the indication, the right or left cursor key is operated to select the other indication DR-CLOSE. Hence the level of the output signal of the circuit 8 is changed so that the alarm is appropriately set.

A similar operation is carried out if the indication DR-CLOSE is selected when the check menu is shown on the display.

During the checking operation, the alarm is adapted so as not to emit the sound although the door is opened.

When the operating conditions of the alarm mode are thus set, the up or down key is operated to resume the operating mode.

From the foregoing it will be understood that the present invention provides an antitheft alarm system of a car and a car stereo mounted in the car, wherein the alarm mode can be easily set by removing a panel of the car stereo from a body thereof. The alarm mode can be easily released by the driver of the car when the panel is attached or when the ignition key is operated.

While the invention has been described in conjunction with preferred specific embodiment thereof, it will be understood that this description is intended to illustrate and not limit the scope of the invention, which is defined by the following claims.

What is claimed is:

1. A car stereo for a motor vehicle, the car stereo having a removable panel attached to a body of the car stereo, the panel having a plurality of operation buttons for operating the car stereo, comprising:

an alarm device provided in the motor vehicle;

first detector means for detecting removing of the panel from the body and for producing a removing signal and an attaching signal dependent on the removing and attaching of the panel;

second detector means for detecting operation of an ignition switch of the motor vehicle and for producing a switch ON signal and a switch OFF signal;

third detector means for detecting opening of a door of the motor vehicle and for producing a door open signal;

first determining means for determining lapse of a predetermined first period of time after the door open signal and for producing an alarm signal unless at least either of the attaching signal or the switch ON signal is generated; and alarm operating means responsive to the alarm signal for operating the alarm device.

2. The car stereo according to claim 1 further comprising second determining means for determining lapse of a predetermined second period of time after removing signal and the switch OFF signal and for producing a lapse signal, the third detector means being provided for producing the door open signal after the lapse signal.

3. The car stereo according to claim 1 further comprising alarm stop means responsive to the attaching signal or the switch ON signal after the operation of the alarm for stopping the alarm operation.

4. The car stereo according to claim 1 further comprising an LED responsive to the removing signal or the switch OFF signal to emit light.

* * * * *